United States Patent [19]
Hughey

[11] 3,746,500
[45] July 17, 1973

[54] CUTTING TORCH TIP
[75] Inventor: Howard G. Hughey, Fanwood, N.J.
[73] Assignee: Airco, Inc., New York, N.Y.
[22] Filed: Apr. 21, 1971
[21] Appl. No.: 135,952

[52] U.S. Cl. .............................................. 431/346
[51] Int. Cl. ........................................... F23d 13/32
[58] Field of Search .......................... 431/346, 347; 239/423, 424, 548, 549

[56] References Cited
UNITED STATES PATENTS
3,182,334  5/1965  Hammin .......................... 431/346 X
2,130,344  9/1938  Jacobsson ............................ 431/346

Primary Examiner—Edward G. Favors
Attorney—Roger M. Rathbun, Larry R. Cassett, Edmund W. Bopp and H. Hume Mathews

[57] ABSTRACT

This invention relates to pre-mix gas fuel cutting torches wherein an annular groove is provided which intersects each of a plurality of pre-mix gas passages whereby a tortuous path is formed having a severe restriction which interrupts and quenches return combustion and thereby creates a high resistance to torch flashbacks or backfires.

3 Claims, 4 Drawing Figures

PATENTED JUL 17 1973 3,746,500

INVENTOR
HOWARD G. HUGHEY
BY
ATTORNEY

CUTTING TORCH TIP

BACKGROUND OF THE INVENTION

In conventional cutting torches a separable cutting tip is provided which is generally of standard dimensions in order to be interchangeably fitted to a torch head. The tips normally include a plurality of longitudinal passages which at one end receive gases from the storage means via the holder and are open at the other end to discharge the gases or mixtures to be consumed in a flame. The tips are adapted to readily fit within a mating cavity in a standard torch head such that the flow of gases is easily facilitated from the head into and through the tip.

These passages include a plurality of radially oriented passages symmetrically arranged about a single, centrally located passageway through the tip for carrying the cutting oxygen from the torch head for direct application to the work piece. The radially oriented passages carry a mixture of fuel and oxygen which is burned to provide a pre-heat function which heats the work piece to a sufficiently elevated temperature whereby the high pressure cutting oxygen causes very rapid oxidation and burning to cut the work piece.

The mixture of this pre-heat gas may be manually determined with the use of controls on the torch with the actual mixing of the separably supplied oxygen and fuel taking place in the tip or the gases may be pre-mixed prior to introduction to the torch tip. The former type is considered a tip-mix torch arrangement.

In the conventional pre-mix type of cutting torch for which the present invention is adapted, the fuel-oxygen mixture is introduced directly from the torch head to the cutting tip pre-heat passageways through use of a chamber which is formed between the torch tip and the torch head cavity when the tip is inserted in operative position in the torch head.

The problem of backfire and flashback has long existed in the cutting torch art and particularly in the utilization of a pre-mix type of cutting tip where the fuel gas and oxygen are mixed together prior to their introduction at a positive pressure into the torch tip. The difficulty is further aggravated in the use of low ignition temperature gases, such as acetylene, where, even after the occurrence of a backfire, certain areas of the gas directing orifices or passageways may retain sufficient heat to reignite the fuel gas upon its introduction to the torch tip, thereby causing a flashback within the internal passageways of the torch.

As used in the art, the terms "backfire" and "flashback" have distinguishable meanings, the former describing a condition where the flame, normally located exterior the working end of the torch tip, is caused to recede rapidly against the normal flow of the combustible mixture and travels back into the torch body. A "flashback," on the other hand, may be a continued burning back within the torch passageways and may be caused by a reignition of combustible gases subsequent to a backfire.

The backfire phenomena is generally initiated by some abonormality such as rubbing a tip on the work, overheating, or slag blow-back. The flame is thereafter propagated back against flow of fuel gas, traveling faster than the normal gas flow through the tip and may cause ignition of the fuel and oxygen mixture into the handle of the torch or further back into supply lines if not quenched or extinguished in some manner.

A typical backfire may occur in one-thousandth of a second and build up an instantaneous peak-back pressure in the order of about 1,400 p.s.i. and the backfire flame travels back through the torch tip causing ignition and an explosion phenomenon within the torch. Normally after the backfire has completed its rearward propagation to its farthest point of travel, possibly even to the actual mixing chamber of the combustible mixture, the flame is extingushed, and the high pressure begins to subside. The fuel and oygen mixture again flows towards the tip end. As this highly combustible mixture reenters the tip, there is a likelihood of reignition due to high temperature surfaces or incandescent ignition particles which remain at or above the ignition temperature of the fuel mixture, and a flashback or continued internal burning is conceivable. A backfire itself is not a dangerous occurrence. However, a flashback, when started, may be destructive in nature if burning continues for an appreciable time.

BRIEF SUMMARY OF INVENTION

In accordance with the present invention, it was found that the introduction of an offset to the normally straight line travel of a backfire explosion, causes the flame to traverse a tortuous path and tends to extinguish the flame. In addition, the offset delayed the reintroduction of fuel gas subsequent to a backfire, allowing sufficient cooling to the internal tip surfaces as to insure surface temperature below the fuel ignition temperatures to eliminate the possibility of a flashback in the torch passageways.

The improved tip of this invention introduces such an offset by providing a circumferential groove of a predetermined width encircling the periphery of the torch tip whereby gases are introduced to pre-heat passages through the groove. In so doing, the gases undergo approximately a 90° change of direction prior to emerging from the tip and therefore, any backfire propagated rearwardly through the pre-heat passages encounters a dead end, and then must traverse a right angle change in direction for each preheat passageway before continuing to or beyond the torch head. By providing a groove construction in every path through which a flashback might travel, the torch is protected from a backfire.

In addition, the use of a circumferential groove has been provided having a predetermined width such that the products of combustion are quenched and cooled in order to reduce the temperature of hot spots or eliminate excessively heated particles which might cause a flashback upon reintroduction of the combustible mixture to the normal passageways.

The improved cutting tip design as illustrated in the accompanying drawings which show several forms of a cutting tip embodying the invention, all of which incorporate the features and advantages described.

Figure 1:
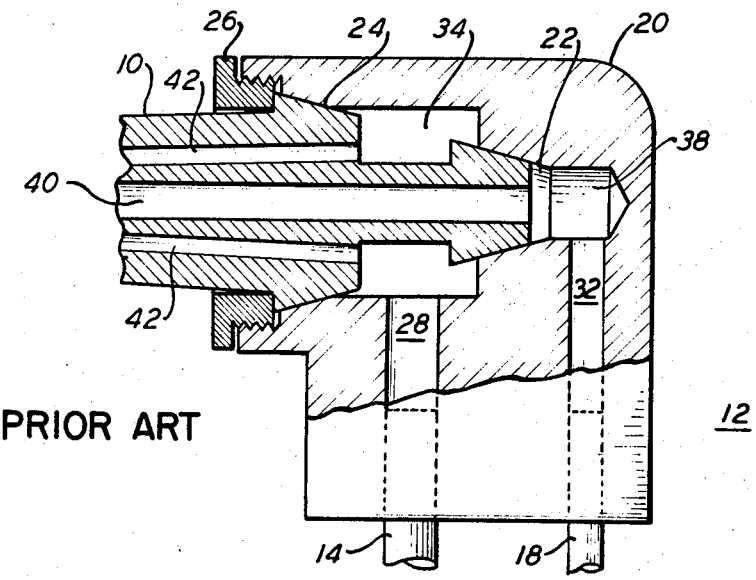
FIG. 1 is a side elevational view, partly in section, of a standard torch head having a conventional pre-mix torch tip installed therein.

Referring particularly to FIG. 1, there is shown a premix type of cutting torch having a conventional tip 10 inserted in a standard torch 12. The torch includes a plurality of conduit pipes which carry the preheat fuel-oxygen mixture as well as a cutting oxygen to the torch tip 10. As shown, these conduits are arranged such that conduit 14 carries the preheat fuel-oxygen mixture at a positive pressure and conduit 18 carries the cutting oxygen under high pressure.

The conduits are connected to suitable sources of gas supply, not shown, where a proper mixture of fuel and oxygen or pre-heat mixture is provided into conduit 14, while oxygen is introduced into conduit 18.

A torch head 20 is in communication with the conduits 14 and 18 and has a conical shaped cavity 22 within which the tip 10 is adapted to closely fit. The tip 10 is, at its rearward end, shaped in a truncated conical configuration 24 which, when inserted into the head 20, provides a tight, sealed connection therebetween as will later be explained.

The tip 10 is retained within the head cavity 22 by conventional means, such as by a threaded ring 26 which forcefully engages and holds the tip 10 in operative position.

A plurality of chambers are formed intermediate the head 20 and the tip 10 when the latter is positioned within the head cavity 22 and, as shown, are located at the ends of passageways 28 and 32 which carry, respectively, pre-heat fuel-oxygen mixture and cutting oxygen from conduits 14 and 18 through the head 20. These chambers, indicated at 34 and 38, receive the respective gases from passageways 28 and 32 prior to the introduction of the gases into the tip 10. Due to the closely fitted mated surfaces of the tip conical surface 24 and the head cavity 22, the chambers 34 and 38 are isolated from each other.

This conventional tip itself has a central passageway for cutting oxygen and a plurality of pre-heat passages 42 which are radially oriented about the central passageway 40 and which carry the pre-heat mixture to the open or forward end of the tip 10. The fuel-oxygen mixture enters from conduit 14 passes through chamber 34 in the torch head 20 and thereafter directly enters the pre-heat passages 42. Due to the relatively large geometric area of the pre-heat passages 42, the chamber 34 and fuel-oxygen conduit 14, there is, in this conventional arrangement, little resistance to the rearward propagation of a flame and therefore a backfire flame is able to traverse with relative ease into the conduit 14 and, in some instances, travel further rearwardly through fuel supply conduits.

Figure 2:
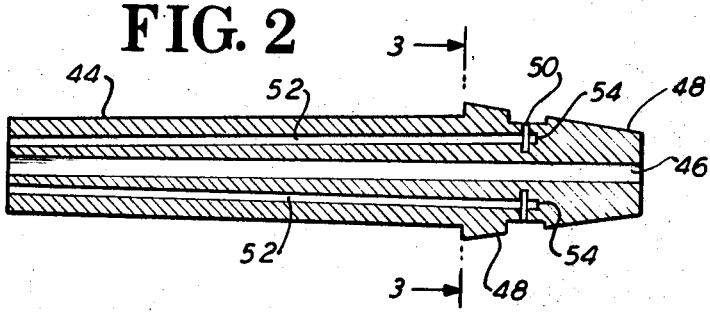
FIG. 2 is a vertical cross-sectional view of a torch tip made in accordance with the present invention.
Figure 3:
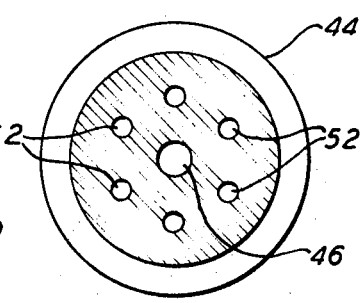
FIG. 3 is an end view of a torch tip shown in FIG. 2.

Referring now to FIGS. 2 and 3 there is shown a torch tip 44 constructed in accordance with the present invention having a conventional central passageway 46 for cutting oxygen. It may be readily seen that the improved tip of FIGS. 2 and 3 is readily adapted for use with the standard torch head shown and described in FIG. 1. In the rearward truncated conical configuration 48 of the tip 44, an annular groove 50 is formed about the circumference of tip 44 which intersects the premix passages 52 at approximately a right angle. The premix passages 52 terminate at the rearward end of tip 44 at a point within the tip 44 itself at a dead end 54. The intersection of the annular groove 50 and the pre-heat passages 52 is preferably located at a point slightly displaced from dead end 54 in order to achieve optimum flashback resistance, however the intersection may be located at the very point the dead-end 54 occurs. In this configuration, the rearwardly propagated flame during a backfire follows a generally straight line path until it reaches the dead end 54 at which point the flame, to continue burning, must retrace its path a finite linear distance in order to continue through the annular groove 50. Thus, the tortuous path traveled tends to distort and extinguish the backfire flame. In the event the flame continues, it them must undergo an approximate right angle turn and travel through the severely restricted annular groove 50 which additionally extinguishes any existing flame. Thus, any flame rearwardly propagated must travel through the aforedescribed tortuous path and is extinguished before it is allowed to continue further back into the head to the fuel-oxygen conduit.

The actual width of the annular groove 50 is generally within the range of from about one-fourth of the diameter of the preheat passages 42 to equal to the diameter of the preheat passages 42. For practical purposes in manufacturing, a wider groove is preferable having generally a standard width for various diameters of the preheat passages. A preferable width has been found to be about 0.030 inches and has been successfully used with most all diameters of preheat passages.

Figure 4:
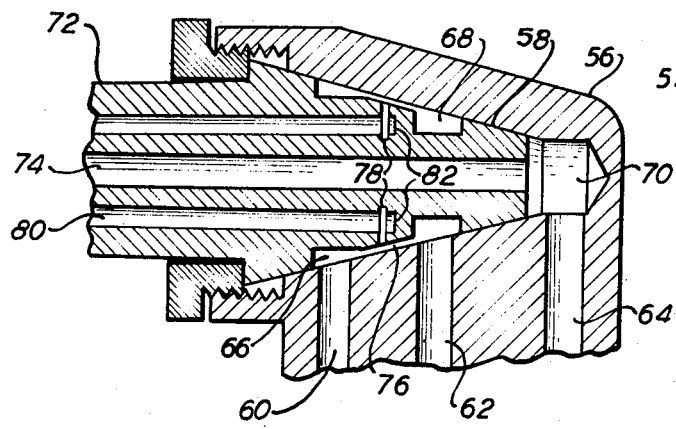
FIG. 4 is a vertical cross-sectional view of an alternate embodiment of the torch tip of this invention.

A further embodiment of this quenching principle is shown in FIG. 4 with a mixing type of torch, however, as will be explained, the mixing of fuel gas and oxygen occurs external of the tip itself.

In FIG. 4, there is shown a head 56, having a conical, head cavity 58 and passageways 60, 62 and 64 which carry, respectively, the combustible gas, pre-heat oxygen and cutting oxygen into chambers 66, 68 and 70, which are forned between the head 56 and tip 72 where the latter is in operative position. A conventional central passageway 74 is provided in tip 72 communicating with cutting oxygen chamber 70. A mixing orifice 76 is provided wherein mixing of the fuel gas from chamber 66 and the oxygen from chamber 68 takes place. The mixed gas from mixing orifice 76 then enters the annular groove 78 and is introduced into pre-mix passages 78. Again, the annular groove 78 is offset a finite distance from the dead end 82 in each of the pre-heat passages 80.

The mixture which is produced in mixing orifice 76 may be determined manually with the use of the controls on the torch handle which adjust the pressure of the respective gases. The mixing orifice 76 itself is formed by recessing slightly that portion 86 of the tip truncated conical surface 84 between the combustible gas chamber 66 and the pre-heat oxygen chamber 68 such that a predetermined clearance is achieved between the inner surface of the head cavity 58 and the recessed portion 86, forming an orifice 76. The combustible gas and pre-heat oxygen enter the mixing orifice 76 at opposite ends and are mixed within the orifice 78 during introduction into the annular groove 78.

Again, as explained, any rearwardly propagated flame reaches a dead end 82 at which point it preferably must retrace its path of travel a finite distance in order to continue through the annular groove 78 back into the conduits or fuel supply.

There is thus provided an improved torch tip having a plurality of pre-heat gas passages which dead-end within the rearward part of the tip, and an annular groove which intersects each of the pre-heat passages through which the combustible mixture must pass in being supplied from gas sources to the operative or flame end of the tip.

I claim:

1. A torch tip adapted to be inserted in a torch handle, said tip having at least one pre-mix passage, said at least one pre-mix passage being open at its forward end and having its rearward end terminating within said tip, said tip also having an annular groove intersecting said at least one pre-mix passage at about a 90° angle at a distance displaced along said pre-mix passage from the rearward end thereof, whereby a fuel mixture may be introduced through said annular groove to said at least one pre-mix passage.

2. A torch tip adapted to be intersected in a torch handle, said tip having at least one pre-mix passage, said at least one pre-mix passage being open at its forward end and having its rearward end terminating within said tip. Said tip also having an annular groove intersecting said at least one pre-mix passage at about a 90° angle at a distance displaced along said pre-mix passage from the rearward end thereof, said at least one pre-mix passage having a diameter of from one to four times the width of said annular groove, whereby a fuel mixture may be introduced through said annular groove to said at least one pre-mix passage.

3. A torch tip adapted to be inserted in a torch handle, said tip having at least one pre-mix passage, said at least one pre-mix passage being open at its forward end and having its rearward end terminating within said tip, said tip also having an annular groove having a width of about 0.030 inch intersecting said at least one pre-mix passage at about a 90° angle at a distance displaced along said pre-mix passage from the rearward end thereof, whereby a fuel mixture may be introduced through said annular groove to said at least one pre-mix passage.

* * * * *